US006829666B1

(12) United States Patent
Deneroff et al.

(10) Patent No.: US 6,829,666 B1
(45) Date of Patent: Dec. 7, 2004

(54) MODULAR COMPUTING ARCHITECTURE HAVING COMMON COMMUNICATION INTERFACE

(75) Inventors: Martin M. Deneroff, Palo Alto, CA (US); Steve Dean, Mountain View, CA (US); Timothy S. McCann, Altoona, WI (US); John Brennan, Mountain View, CA (US); Dave Parry, Mountain View, CA (US); John Mashey, Mountain View, CA (US)

(73) Assignee: Silicon Graphics, Incorporated, Mountain View, CA (US)

( * ) Notice: Subject to any disclaimer, the term of this patent is extended or adjusted under 35 U.S.C. 154(b) by 0 days.

(21) Appl. No.: 09/408,874

(22) Filed: Sep. 29, 1999

(51) Int. Cl.[7] .............................................. G06F 13/38
(52) U.S. Cl. ...................................................... 710/126
(58) Field of Search ............................... 710/126, 305; 712/11, 12, 13, 15, 31, 10; 709/205

(56) References Cited

U.S. PATENT DOCUMENTS

| | | | | |
|---|---|---|---|---|
| 5,339,396 A | * | 8/1994 | Muramatsu et al. | ........ 395/325 |
| 5,504,874 A | | 4/1996 | Galles et al. | ............... 395/472 |
| 5,509,125 A | | 4/1996 | Johnson et al. | ............. 395/300 |
| 5,664,151 A | | 9/1997 | Galles et al. | ............... 711/145 |
| 5,682,479 A | * | 10/1997 | Newhall et al. | ....... 395/200.15 |
| 5,721,819 A | * | 2/1998 | Galles et al. | .......... 395/200.15 |
| 5,878,241 A | | 3/1999 | Wilkinson et al. | .......... 395/379 |
| 6,055,599 A | * | 4/2000 | Han et al. | .................... 710/132 |

FOREIGN PATENT DOCUMENTS

WO   99/26429   5/1999   ............ H04Q/3/00

OTHER PUBLICATIONS

Laudon, J., et al., "The SGI Origin: A ccNUMA Highly Scalable Server", *Computer ARchitecture News, vol. 25, No. 2, XP000656582*, 241–251, (May 1997).

* cited by examiner

Primary Examiner—P. Austin Bradley
Assistant Examiner—X. Chung-Trans
(74) Attorney, Agent, or Firm—Schwegman, Lundberg, Woessner & Kluth, P.A.

(57) ABSTRACT

A distributed, shared memory computer architecture that is organized into a set of functionally independent processing nodes operating in a global, shared address space. Each node has one or more local processors, local memory and includes a common communication interface for communicating with other modules within the system via a message protocol. The common communication interface provides a single high-speed communications center within each node to operatively couple the node to one or more external processing nodes, an external routing module, an input/output (I/O) module. The common communication interface that facilitates the ability to incrementally add and swap the nodes of the system without disrupting the overall computing resources of the system.

25 Claims, 17 Drawing Sheets

512 CPU  EXTENDED HYPERCUBE TOPOLOGY

MODULAR COMPUTING ARCHITECTURE HAVING COMMON COMMUNICATION INTERFACE

TECHNICAL FIELD

This invention is generally related to the field of high-speed computing systems and, more particularly, to a computer architecture having an flexible and incrementally scalable common communication interface that facilitates a wide variety of modular computing topologies.

BACKGROUND

With modem high performance computers, commonly known as supercomputers, there is an ever pressing need for more computing resources such as processors and input/output ports. Industry, therefore, is continuously developing high-speed computing systems in a wide variety of computing topologies and that support an increased number of computing resources. It is often difficult, however, to incrementally scale an existing computing system to a larger topology having more computing resources without disassembling the current configuration. In addition, it is often difficult to produce a wide variety of computing systems, including both low-end supercomputers and mid-range supercomputers, from a single manufacturing line. Thus, there is a need in the art for computer architecture in which high-speed computing systems can easily be configured and incrementally scaled in a modular fashion.

SUMMARY OF THE INVENTION

The present invention is directed to a distributed, shared memory computer architecture that is organized into a number of nodes, where each node has at least one processor. According to the invention, each node includes a common communication interface that facilitates the ability to incrementally build and swap the nodes of the system without disrupting the overall computing resources of the system. More specifically, the common communication interface within each node connects local memory to the local processors, provides a port for communicating with a system-wide routing network and a port for communicating with an I/O subsystem. In this manner, each computing topology is a superset of smaller topologies supported by the architecture. As such, computing systems based upon the architecture may be easily and incrementally scaled without reconfiguring the existing components.

DETAILED DESCRIPTION

The shortcomings, disadvantages and problems described in the background are addressed by the present invention, which will be understood by reading and studying the following specification. The present invention is directed to a distributed, shared memory computer architecture that is organized into a number of nodes, where each node has at least one processor. According to the invention, each node includes a common communication interface that facilitates the ability to incrementally build and swap the nodes of the system without disrupting the overall computing resources of the system. More specifically, the common communication interface within each node connects local memory to the local processors, provides a port for communicating with a system-wide routing network and a port for communicating with an I/O subsystem.

As described in detail below, independent routing modules are used within the architecture to communicatively couple the nodes in a wide variety of topologies. As a result, highly flexible and scalable high-speed computers may easily be constructed. The computer architecture is especially useful in constructing computing systems having a large number of processors, such as up to 4096, that share a single address space and require cache coherence across all of the nodes of the high-speed computer.

In this manner, these processing nodes and the routing modules are the basic building blocks for configuring a high-speed computing system and, therefore, are collectively referred to as bricks that may readily be interconnected in a variety of topologies. The computing system may include an arbitrary combination of processing nodes and other modules such that there need not be a fixed relation between the number of processing nodes and the other modules. Furthermore, as explained in detail below, each topology supported by the architecture is a superset of the smaller topologies supported by the architecture. Table 1 illustrates the various modules used within the computer architecture.

TABLE 1

| Brick | Description |
| --- | --- |
| C-Brick-MIPS | A CPU node populated with the MIPS processors. |
| C-Brick-Merced | A CPU brick populated Merced processors. |
| P-Brick | An IO brick that provides 14 PCI slots. |
| I-Brick | An I/O brick that supports complete IO needs of an entry level system. |
| X-Brick | An IO brick that provides four XIO slots. |
| R-Brick | A routing node providing eight routing ports. |
| Power Bay | A power bay providing power to a given rack of modules. |
| D-Brick | A diskette or disc drive module also referred to as a disc box. |

Figure 1A:
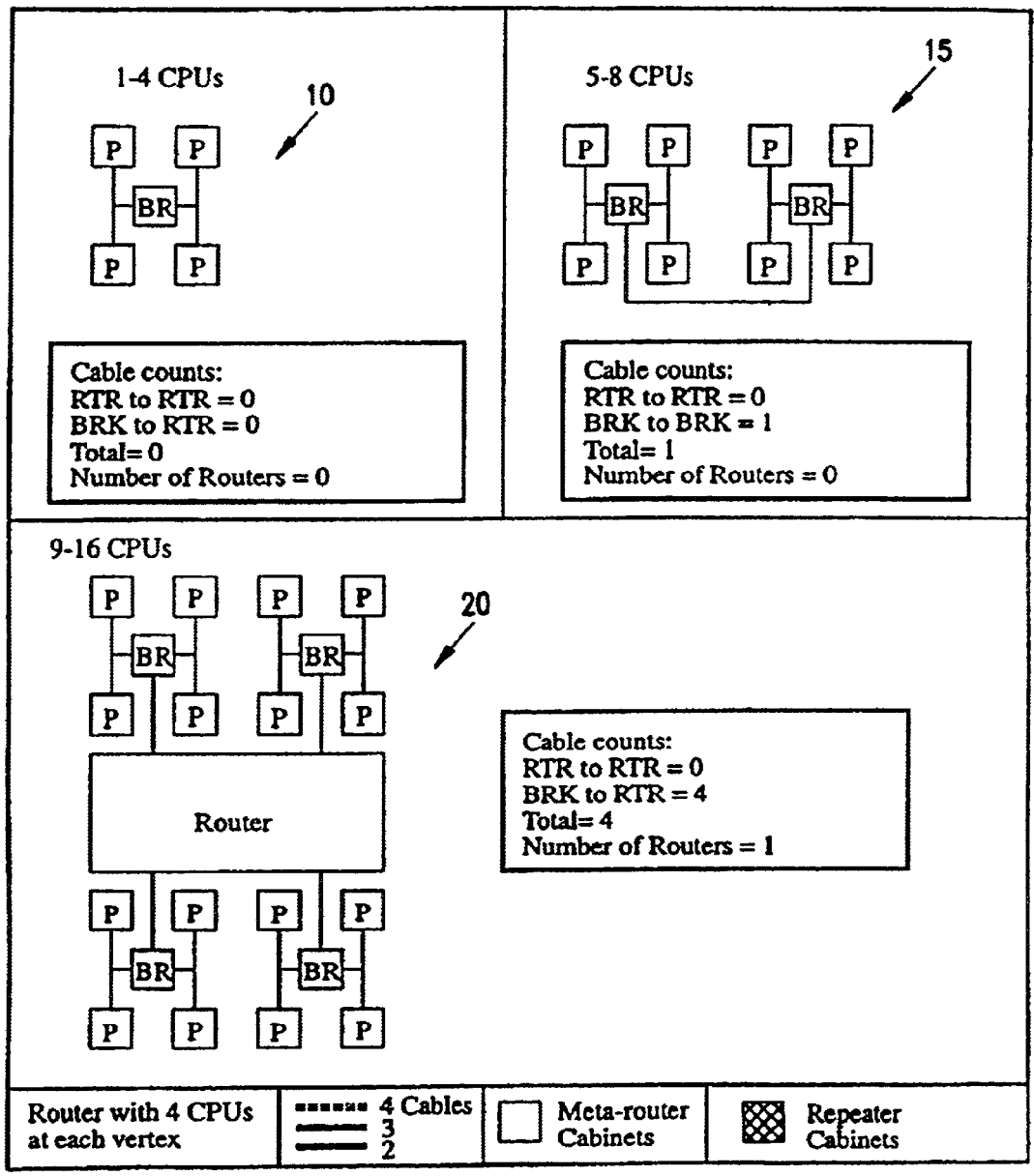
FIGS. 1A and 1B are logical block diagrams that illustrate various embodiments of how the functionally independent modules of the inventive architecture may be combined in various topologies to form a high-speed computing systems.
Figure 1B:
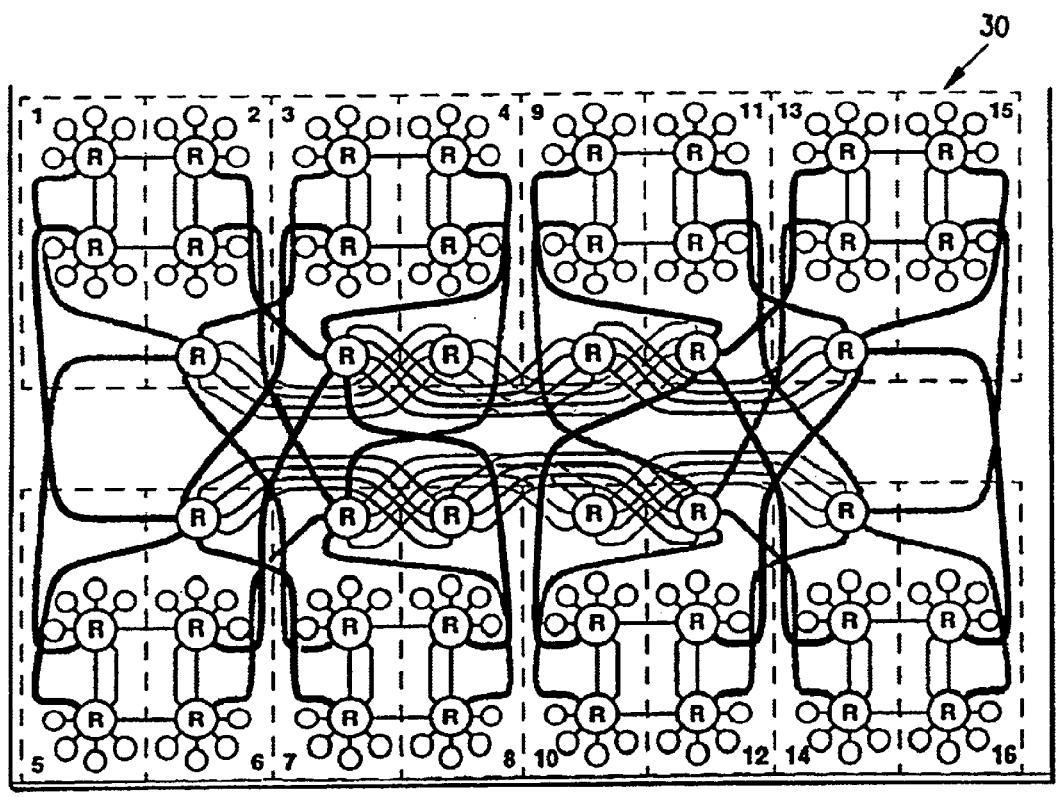

FIGS. 1A and 1B are logical block diagrams that illustrate various embodiments of how the functionally independent bricks described above may be combined in various topologies to form high-speed computing systems. For example, FIG. 1A illustrates three computer topologies 10, 15 and 20. Topology 10 illustrates a single node having four processors (P) connected by a single common communication interface (BR). Topology 20 illustrates an eight processor topology in which two nodes are communicatively coupled via their respective common communication interfaces. Topology 30 illustrates a sixteen processor topology in which four nodes are communicatively coupled via a single routing module. FIG. 1B illustrates an extended hypercube computer topology in which nodes having 512 processors are interconnected according to the flexible architecture described herein.

As illustrated in FIGS. 1A and 1B, each computing topology is a superset of smaller topologies supported by the architecture. More specifically, topology 15 is a superset that includes two topologies 10. Similarly, topology 20 is a superset that includes four topologies 10, or two topologies 15. As such, computing systems based upon the inventive architecture described herein may be easily and incrementally scaled without reconfiguring the existing components.

Figure 1C:
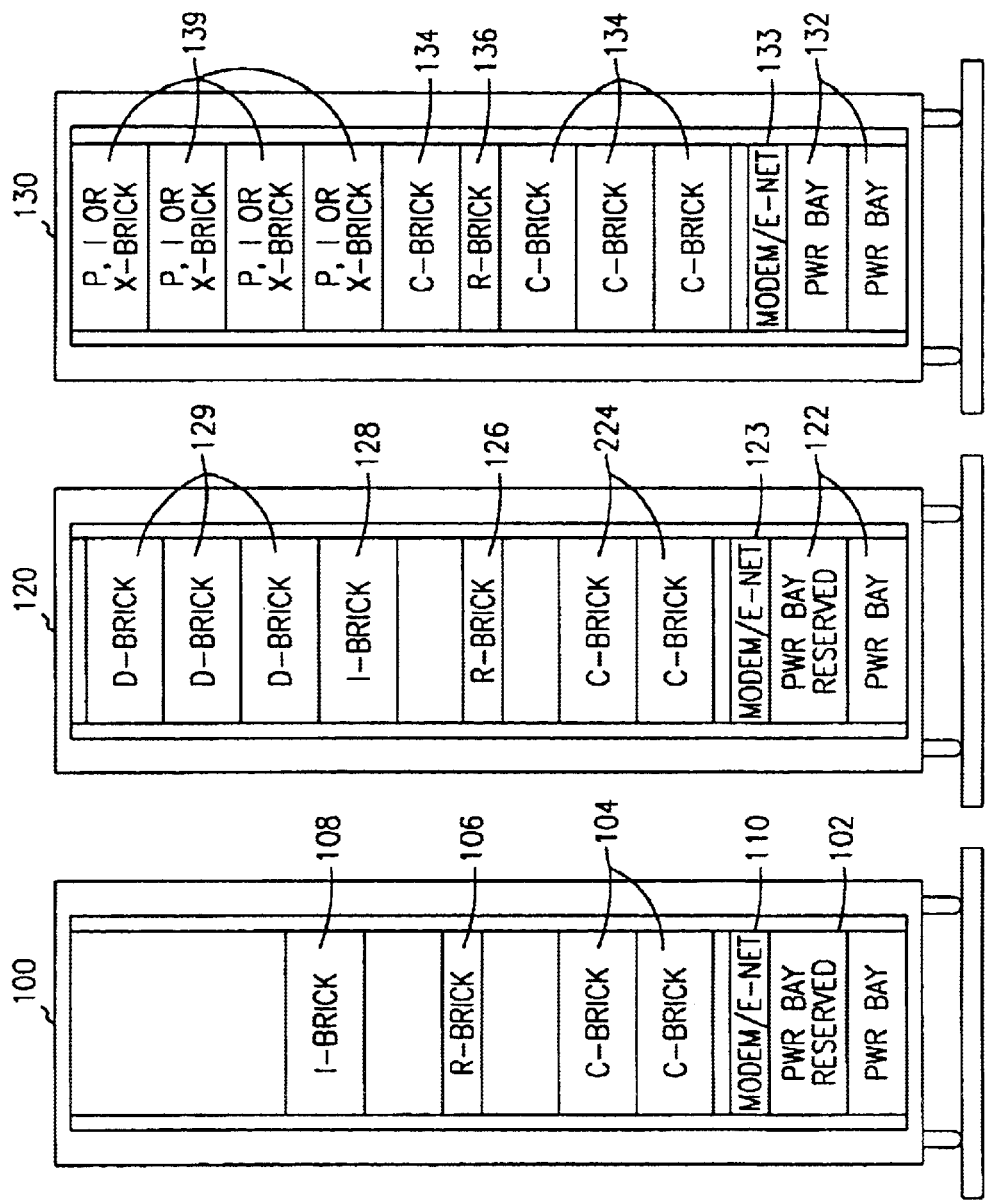
FIG. 1C illustrates three high-speed computing systems constructed using the flexible and scalable modular system described herein.

FIG. 1C illustrates an isometric view of three high-speed, rack-mounted computing systems constructed using functionally independent bricks and architecture of the present invention. More specifically, high-speed computing system 100 illustrates a low-cost entry into high-speed computing and includes power bay modules (Pwr Bay) 102, two processing nodes (C-Bricks) 104 that include multiple processors, a single routing module (R-Brick) 106 and a single input/output module (I-Brick) 108. High-speed computing system 120, on the other hand, illustrates an intermediate system with two processing nodes (C-Brick 124), a single routing module (R-Brick) 126, a single I/O module (I-Brick) 128, two power modules (Pwr Bay) 122 and three drive bays (D-Bricks) 129. High-speed computing system 130 illustrates a higher end computer having power modules (Pwr Bay) 132 and network connection module 133, four processing nodes (C-Bricks) 134 and routing module (R-Brick) 136. The four remaining I/O modules can be any combination of P-Bricks, I-Bricks and X-Bricks.

Figure 1D:
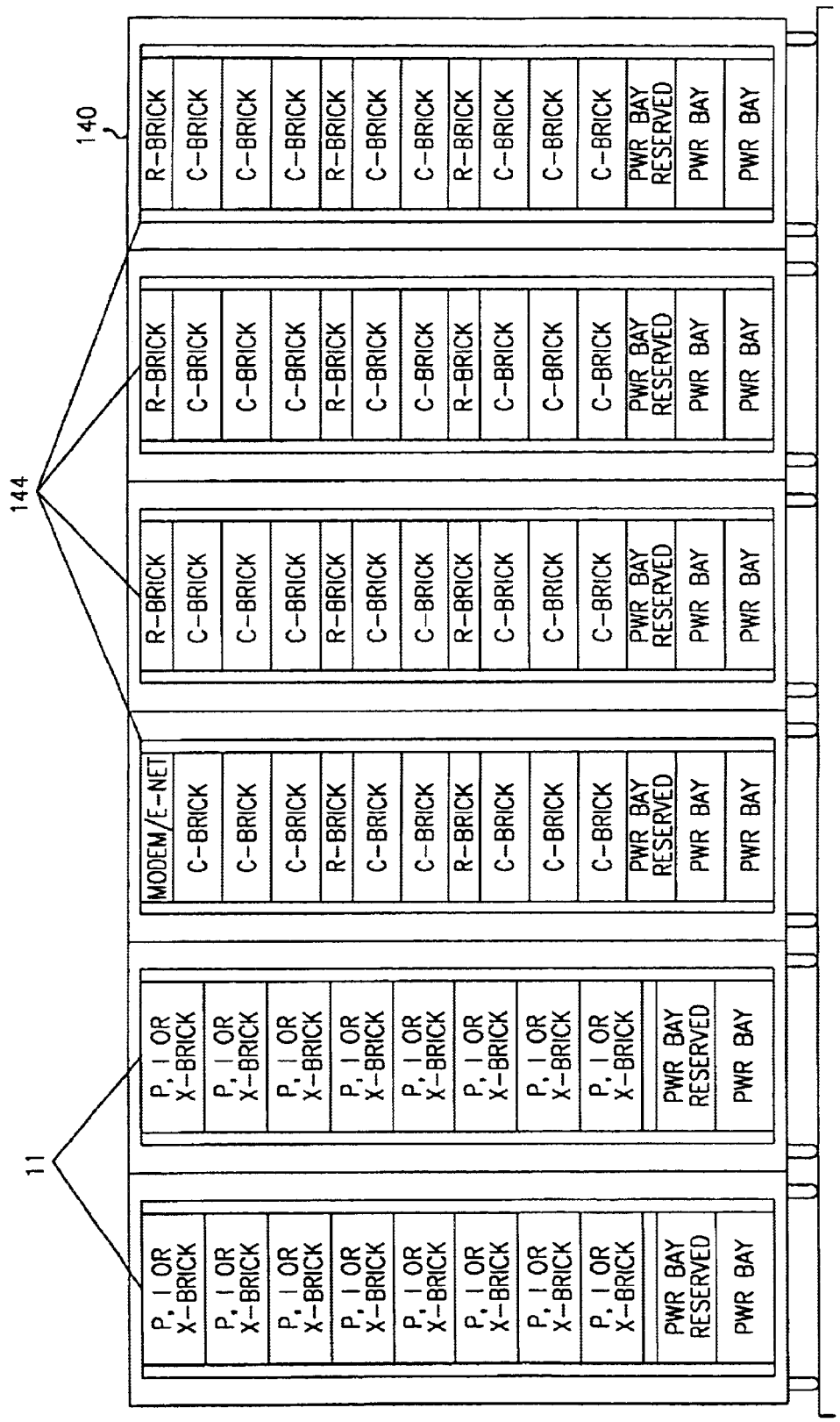
FIG. 1D illustrates a high-performance processing system 140 having six vertical racks suitable for the modules described herein.

FIG. 1D illustrates one quarter of a high-performance processing system 140. Six vertical racks of the twenty-four are illustrated. In the illustrated embodiment, computing system 140 can have up to eight C-Bricks per rack, up to 16 racks for a total of 512 CPUs. In addition, system 140 can have two or three routing modules per rack and multiple power bays per rack. Computing system 140 further includes multiple I/O racks 142 that may comprise one to eight P, I or X Bricks.

Processing Nodes (C-Bricks)

Figure 2:
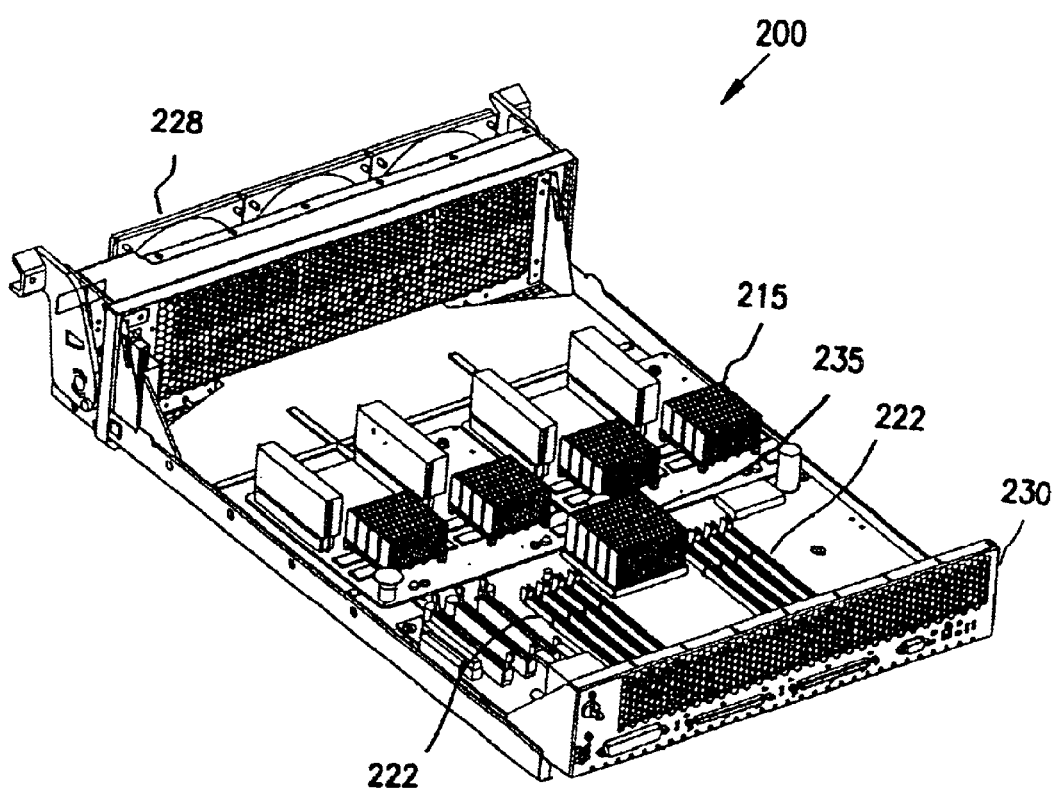
FIG. 2A illustrates one embodiment of a C-Brick. This module contains four CPUs and eight memory slots.

FIG. 2 illustrates one embodiment of a processing node 200 of the present invention. The processing node 200, referred to as a C-Brick, is a functionally independent module containing four local CPUs, local memory and the associated electronics required to operate as an independent distributed module. A C-Brick provides the following: 1) a high-speed serial channel to communicate between a system controller and the brick, 2) a high-speed serial channel to communicate with an internal level one (L1) system controller, 3) an external high-speed serial console port for a serial channel to communicate with an L1 system controller in an I/O-Brick.

The illustrated embodiment contains four CPUs 215 and eight memory slots 222. Memory slots 222 are designed to accept DIMM modules which support two rows of ten SDRAM chips. Front-mounted fans 228 are removable from the front, redundant and hot-swappable. External connectors 230 at the rear of the C-Brick 200 provide connections for power, routing network, I/O, and Universal Serial Bus (USB). As described below, the USB connector is used for connection to an optional level two (L2) system controller in small systems that do not have a routing module.

Processing node 200 includes a common communications interface 235 that facilitates the ability to incrementally build and swap the nodes of the system without disrupting the overall computing resources of the system. More specifically, the common communications interface 235 within node 200 connects local memory present in slots 222 to local processors 215 and, as discussed in detail below, provides a intelligent, high-speed interface to connectors 230.

Routing Modules (R-Bricks)

Figure 3:
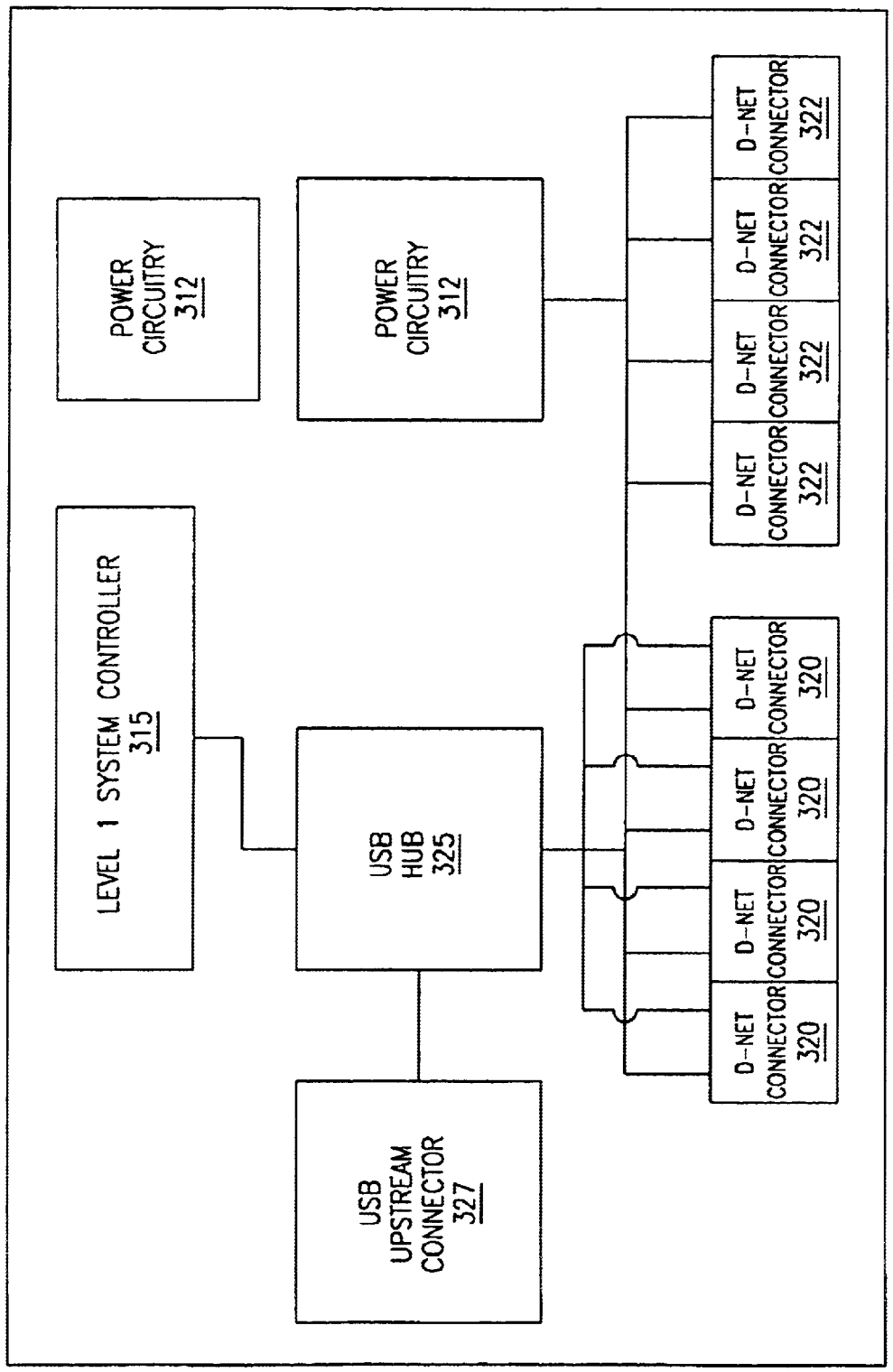
FIG. 3 illustrates an isometric view of a router module 300 herein referred to as the R-Brick.

FIG. 3 is a block diagram illustrating a routing module 300 herein referred to as an R-Brick. The R-Brick provides the following: 1) a high-speed serial channel to communicate between an internal L1 system controller and an internal router ASIC, 2) a USB slave port to communicate with a level two (L2) system controller and a level three (L3) system controller, 3) a USB hub with five master ports.

R-Brick 300 contains a single router ASIC 310, power circuitry 312, interface connectors 320 and 322, a level two (L2) system controller 315, USB hub 325 and USP upstream connector 327. Connectors 320 and 322 are D-Net connectors that, according to the invention, allow various modules to easily be interconnected and interchanged. Four of the D-Net connectors 320 of R-Brick 300 carry L2 system controller USB signaling. Another four D-Net connectors 322 carry all router-to-router communications. Thus, according to this embodiment, four C-Bricks may be coupled to R-Brick 300 via connectors 320 while four other routing modules may be connected to R-Brick 300 via connectors 322. In another embodiment, router module 300 has only six ports.

Input/Output Modules (I-Brick, P-Brick and X-Brick)

Three I/O modules are provided by the inventive computer architecture: an I-Brick, an X-Brick and a P-Brick. The I-Brick is intended to provide all of the IO needs for a basic system or to provide the boot requirements of a larger, more complex system. The P-brick provides twelve 64 bit PCI slots. The X-Brick is an IO expansion brick that provides four half-height XIO slots.

Figure 4:
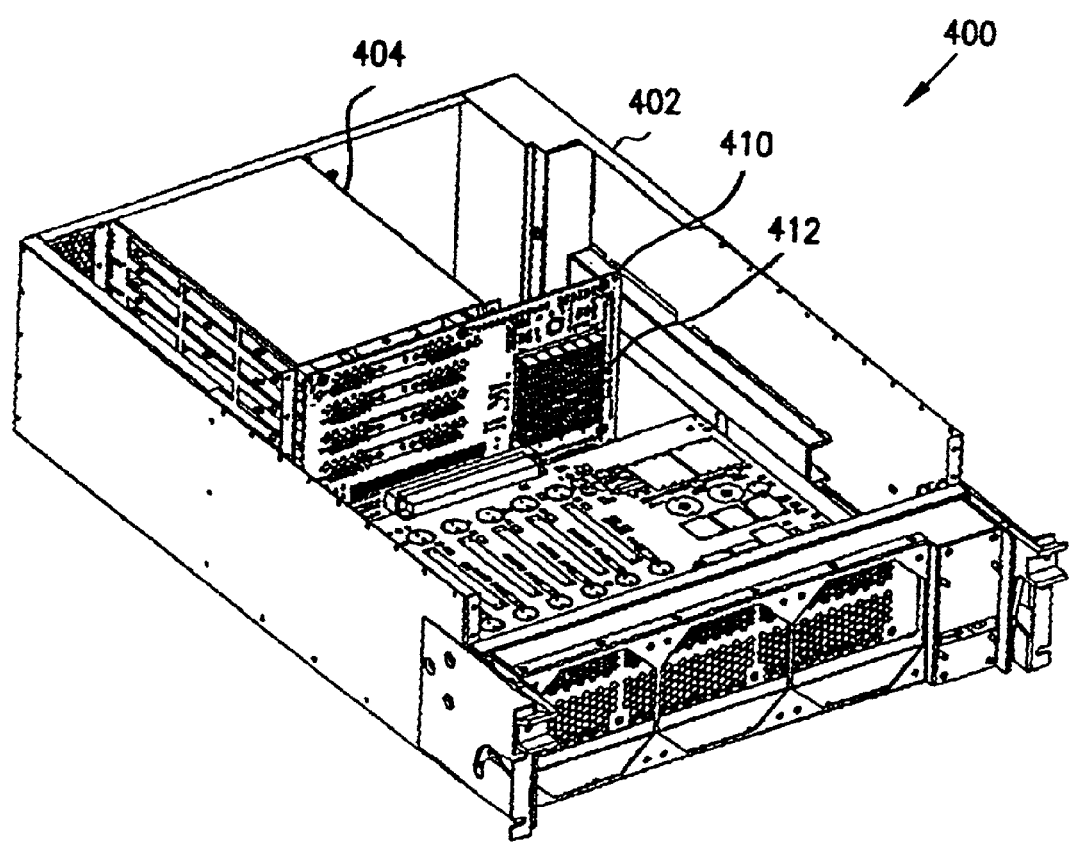
FIG. 4 illustrates an isometric view of an I/O module referred to herein as an X-Brick.

FIG. 4 illustrates an isometric view of an I/O module referred to herein as an X-Brick. The X-Brick provides the following functionality: 1) a serial channel to communicate with an internal L1 system controller within a C-Brick, and 2) a means for reading and reporting the population of the I/O cards. More specifically, X-Brick 400 includes four I/O cards 404 that plug horizontally from the rear of box 402. A single host interface card also plugs horizontally from the rear. A mid-plane PCA 410 mounted vertically in the center of X-Brick 400 contains a single X-Bridge ASIC 412 for controlling I/O.

Figure 5:
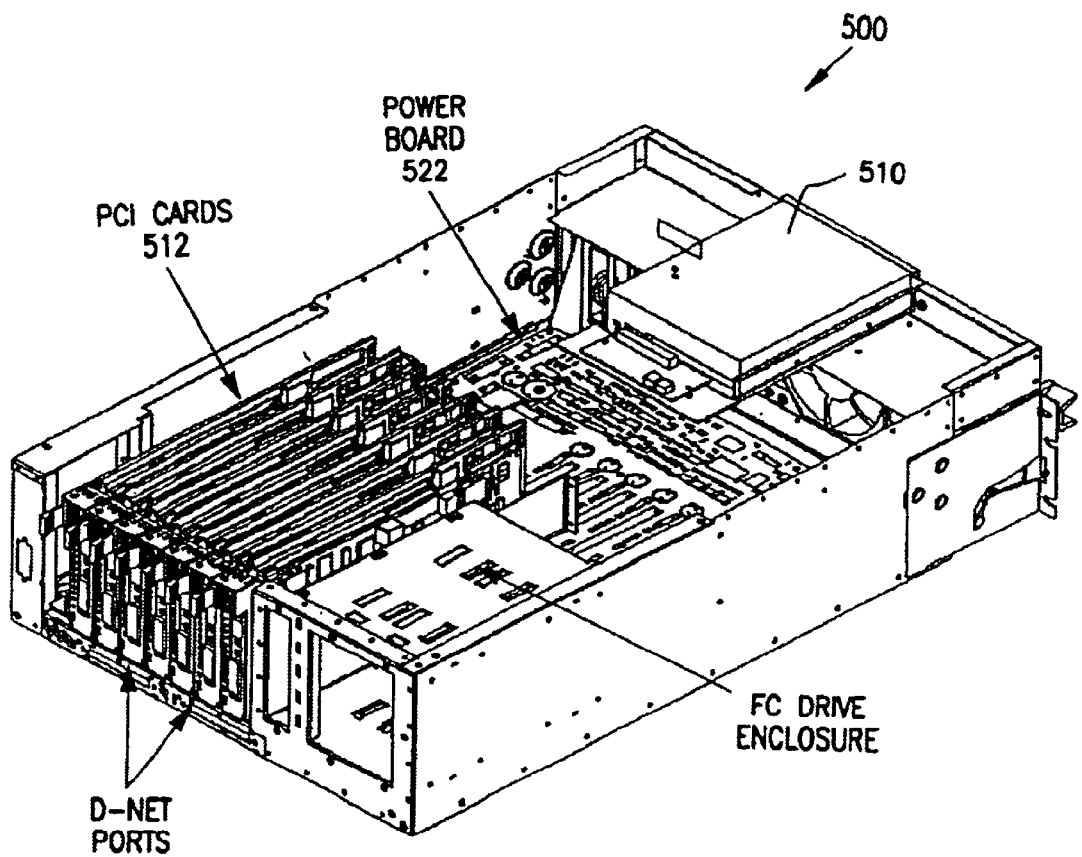
FIG. 5 is an isometric view of an input/output module 500 herein referred to as an I-Brick.

FIG. 5 is an isometric view of an input/output module 500 herein referred to as an I-Brick. The I-Brick and the P-Brick provides the following: 1) a serial channel to communicate with the internal L1 controller within a C-Brick, 2) a means for reading and reporting the population of PCI cards, 3) a means for controlling the powering of PCI slots, 4) a means for controlling and monitoring the status of the power bay. In the illustrated embodiment, I-Brick 500 includes six PCI input/output boards 512 and a CDROM/DVD player 510. Power board 522 houses a single X-Bridge ASIC for controlling I/O. A pair of XTalk I/O ports are located on the rear of I/O module 500 and connect I-Brick 500 to one or two C-Bricks. In one embodiment, I-Brick 500 contains two removable fiber channel hard drives and a single removable media drive 510. Power board 522 mounts horizontally from the front of I-Brick 500 and accepts 48 volts DC as input and generates the required DC voltages for the system board, the PCI slots 512, disc drives 510.

Figure 6:
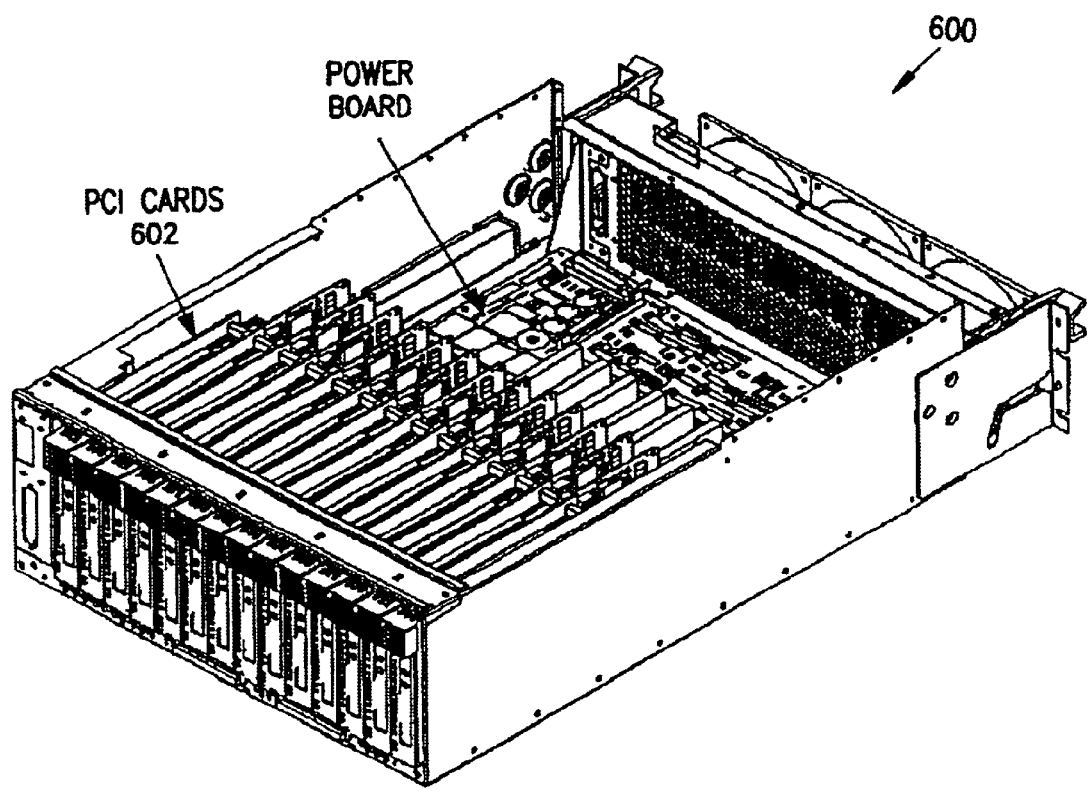
FIG. 6 illustrates one embodiment of an output module 600 referred to herein as a P-Brick, which is a more powerful input/output module than the I-Brick 500.

FIG. 6 illustrates one embodiment of an output module 600 referred to herein as a P-Brick, which is a more powerful input/output module than the I-Brick 500. More specifically, P-Brick 600 houses three X-Bridge ASICs and provides 12 PCI slots 602.

Racks and Power Bays

Figure 7:
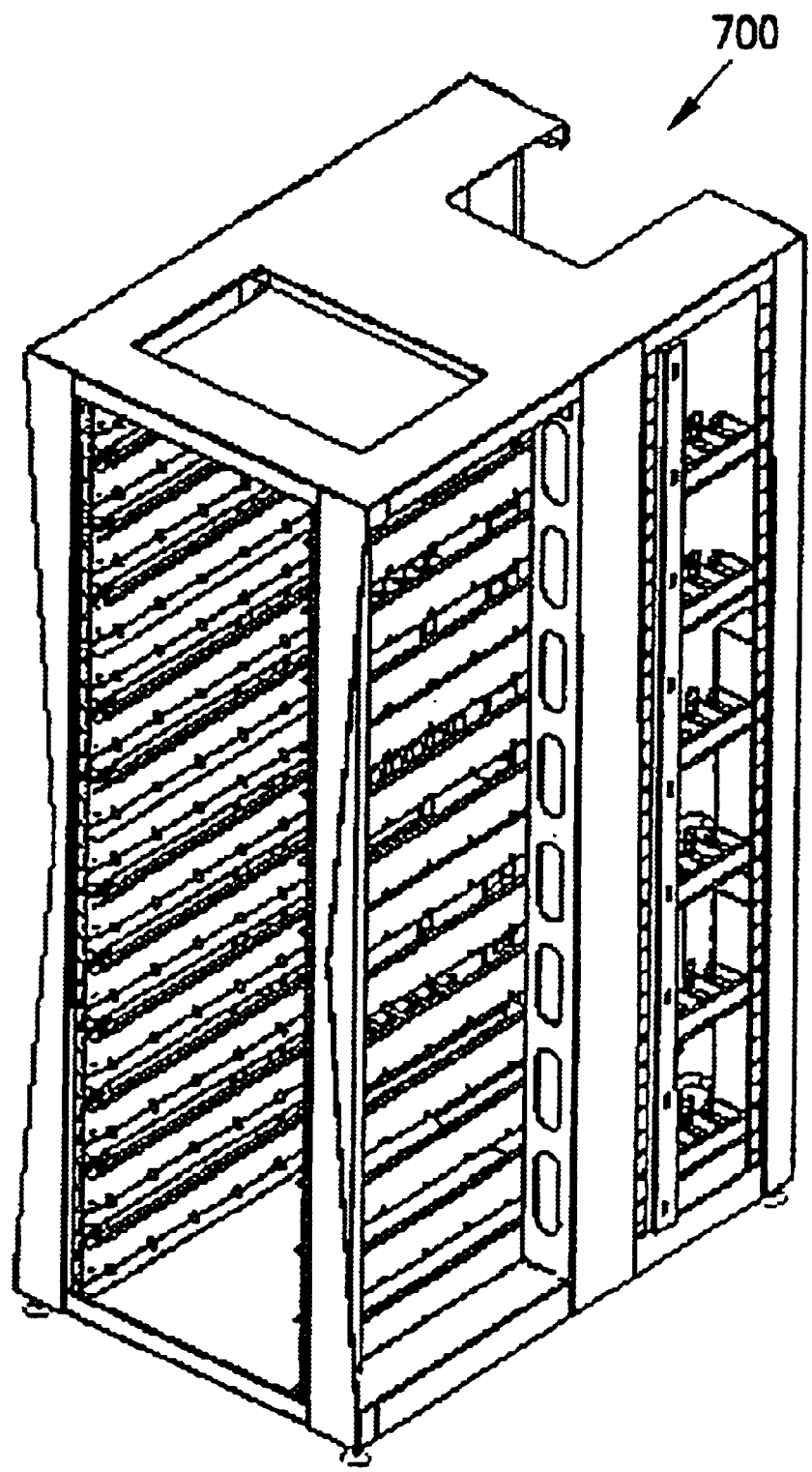
FIG. 7 illustrates a computer rack 700 suitable for receiving one or more independent modules as described in this application.

FIG. 7 is an isometric view of a computer rack 700 suitable for receiving one or more independent modules as described in this application. For example, rack 700 can receive one or more C-Bricks, P-Bricks, I-Bricks or X-Bricks. In this manner, a scalable computer may easily be manufactured. Other embodiments of rack 700 are possible, such as a short rack or a dual-column rack.

Figure 8:
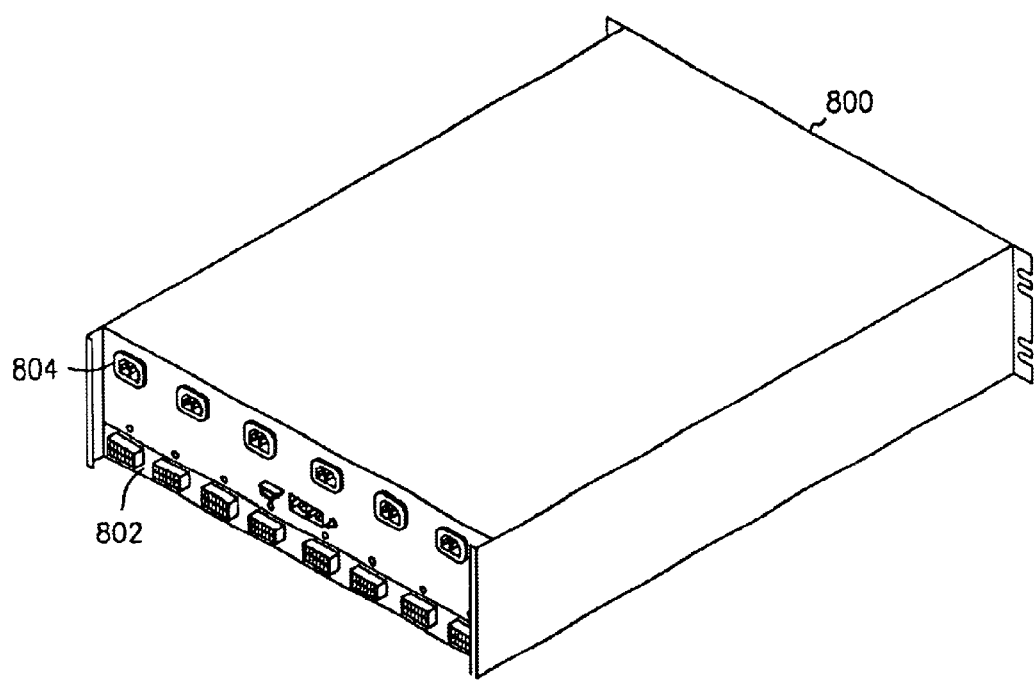
FIG. 8 is an isometric view illustrating a power module 800 herein referred to as a P-Bay.

FIG. 8 is an isometric view illustrating a power module 800 herein referred to as a Pwr-Bay. In one embodiment, Pwr-Bay 800 holds up to six power supplies that are single-phase AC input and 950 watts at 48 VDC output each. As illustrated in FIG. 8, Pwr-Bay 800 includes eight connectors 804 on the rear of the module. These connectors carry the 48 VDC power along with monitoring signals. P-Bay 804 further includes eight serial interfaces for monitoring each power supply. The distributed architecture described herein requires, in one embodiment, a 48 volt supply.

System control and Interconnection Topologies

The distributed architecture of the present invention has a three-level hierarchy for system management. The heart of the architecture is an L1 system controller (not illustrated) that exists within each brick of the inventive architecture except the D-brick. This controller includes a microcontroller, a system monitoring chip, a scan interface chip, plus a collection of serial EPROMs, bus expanders and communication interfaces which are specific to the device it controls. The L1 system controller is responsible for power control and sequencing, environmental control and monitoring, initiation of reset, and the storage of identification and configuration information for its host brick. The L1 system controller also provides console/diagnostic and scanned interfaces to the user.

Figure 9:
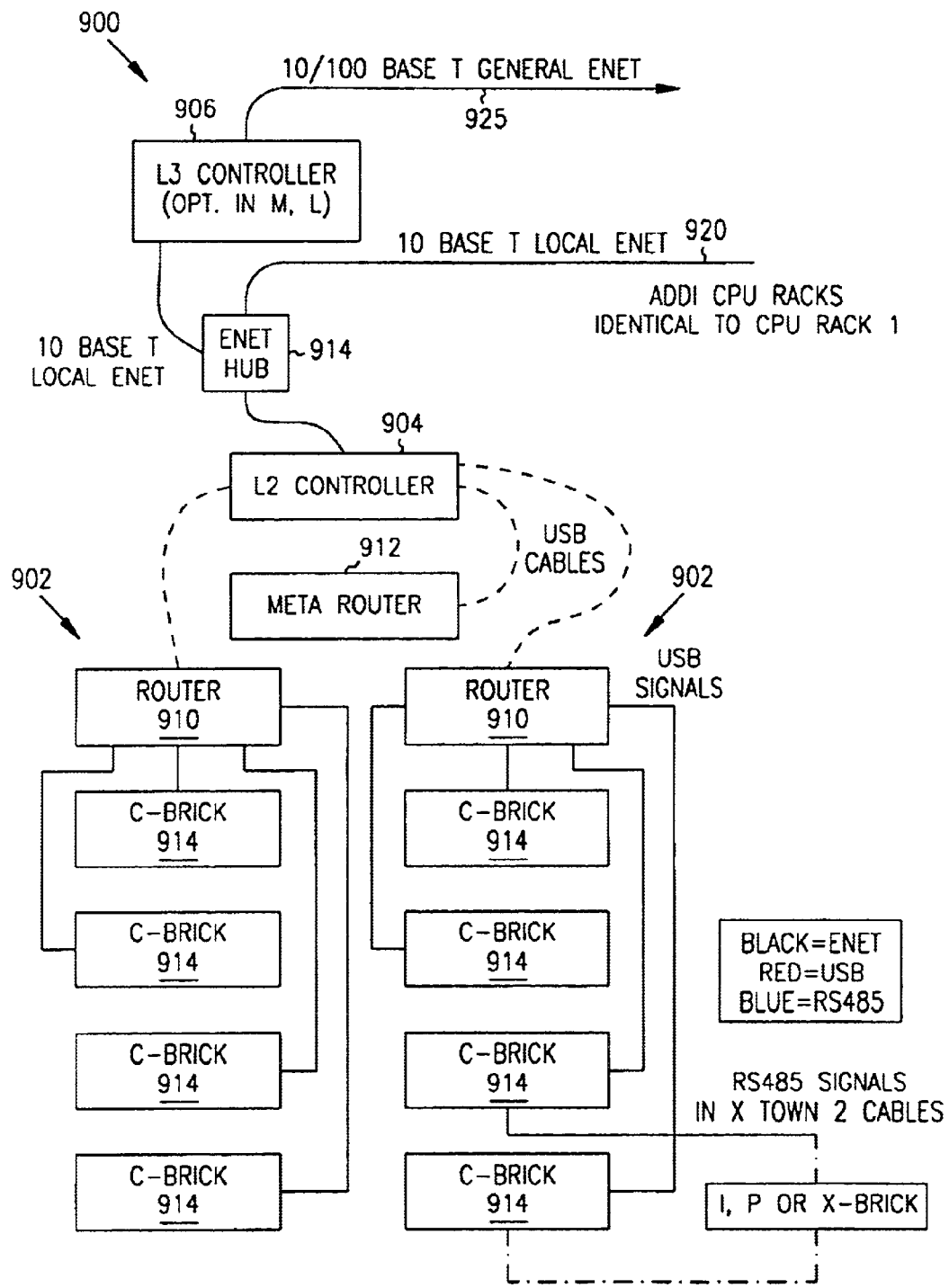
FIG. 9 illustrates a wiring diagram for a typical high-speed computing system comprising the flexible and scalable independently functional modules described herein.

FIG. 9 illustrates a wiring diagram for a typical high-speed computing system comprising the functional modules described herein. An L2 system controller 904 provides rack-level system control, i.e., there is one L2 system controller 904 for each rack having C-Bricks. Moreover, the L2 system controller 904 acts as a central communications clearinghouse for the rack and controls all of the bricks in that particular rack and associated I/O racks. In one embodiment, each L2 system controller 904 is equipped with a touch screen display and ethernet and modem ports, and can be used as a central point of control for the system. A third level of control is the L3 system controller 906 that provides a central point of control for the entire system and, in one embodiment, is a standalone workstation or laptop.

Computing system 900 includes a first rack 902 that contains two routing modules 910 (R-Bricks) and eight processing nodes 914 (C-Bricks). Because each routing modules 910 has four ports, four C-Bricks may be coupled to the router. Each C-Brick 914 is connected to one of the routing modules 910 via a single high-speed USB cable. Similarly, each routing module 914 is connected to the L2 system controller 904 via USB cables. Computing system 900 further includes a meta-router 912. The first CPU rack 902 also includes a single ethernet hub 914 that connects to additional CPU racks via local network 920. In addition, the L3 system controller may connect to other computers via network 925.

The L1 system controller within each brick provides direct low-level communications and control for all of the functions within a brick. In most systems, it acts as a slave to upstream L2 system controller 904. In one embodiment, however, which are limited to a smaller number of processing modules C-Bricks, one L1 system controller may act as a master controller for the entire system if no L2 system controller 904 is present.

The modules as described herein and their interconnects provide a wide variety of possible topologies having several different communication paths. For example, an L3 system controller may communicate directly to the L1 system controller of a C-Brick. Because a C-Brick has a standard upstream USB port, it is possible for the L3 to interface directly to the system without an L2. If there is an L2, then the upstream USB port of the C-Brick will be made inaccessible because the L1 of the C-Brick will already be using that USB channel to communicate with an R-Brick L1. It is also possible for an L3 system controller to communicate directly to an L2 system controller. As discussed above, this is typically via a network connection through a network hub. Otherwise, an L3 system controller can be connected directly to an L2 with a cross over twisted pair cable. If a routing module is included in the computing system, a L2 system controller is required.

The L2 system controller will act as a USB host for the particular rack. As described above, the L1 controller of the routing module contains a USB hub which drives the USB signaling to the local L1 and out on the four ports which are connected to the C-Bricks. It is therefore possible for an R-Brick to be coupled directly to a C-Brick. An R-Brick has a USB hub whose downstream ports will be routed in a shielded pair to the L1 system controller of the C-Brick. In some systems, it is possible for a C-Brick to communicate directly to another C-Brick. For example, if a routing module is not present and an L2 and L3 system controller is not present, then USB cannot be used as a communication mechanism. Thus, in a system with up to two C-Bricks, the L1 system controller of the bricks communicate with each other via RS422 over cables. In addition, it is possible for the L1 system controller of a C-Brick to be coupled directly to the L1 system controller of an I/O-Brick. Since the C-Bricks and I/O-Bricks need to communicate in routerless systems, they are configured to communicate via RS422 over cables as well.

Figure 10:
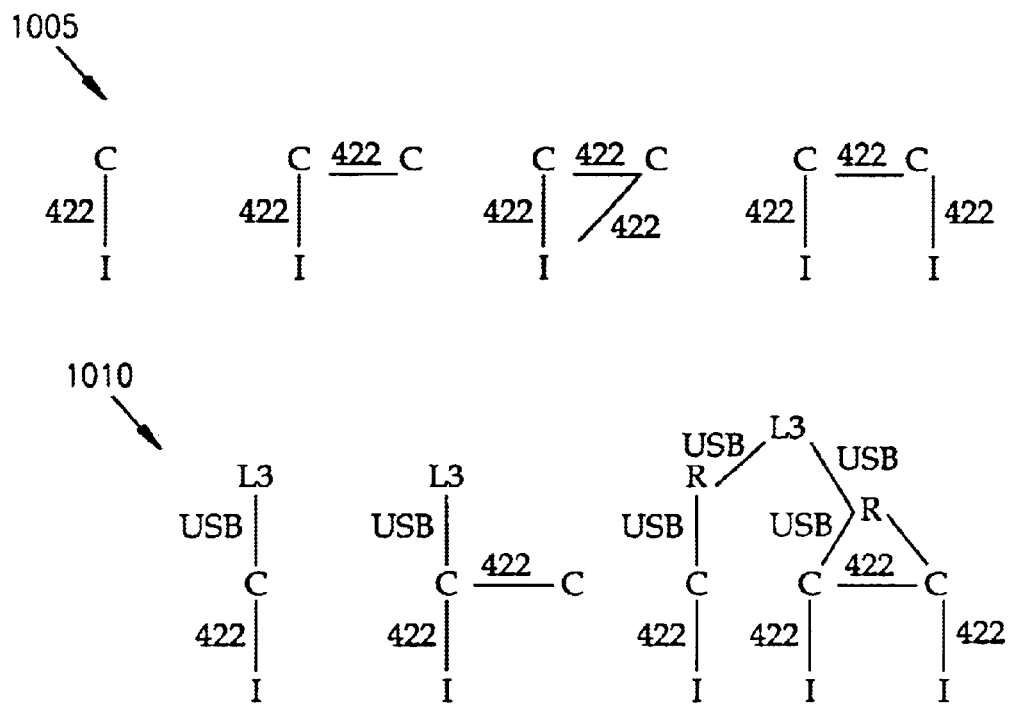
FIGS. 10, 11 and 12 illustrate possible topologies based on the above discussed interconnect rules.
Figure 11:
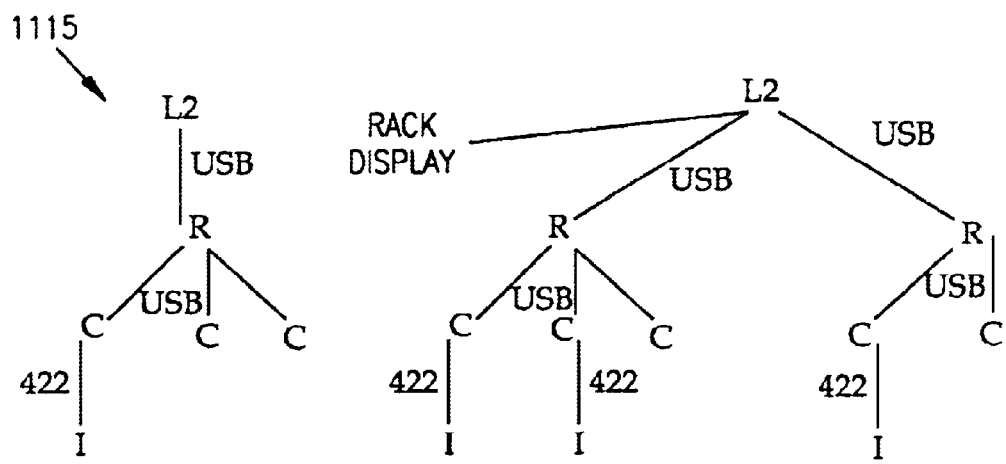
Figure 12:
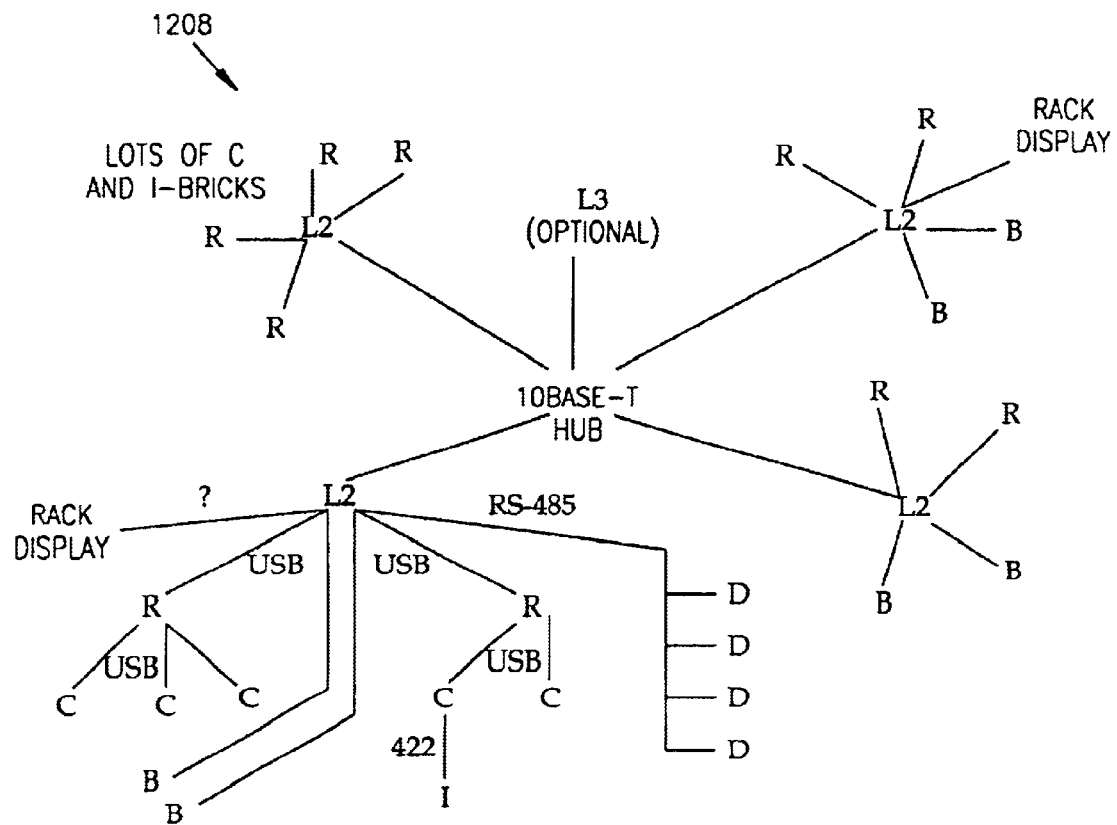

FIGS. 10, 11 and 12 illustrate possible topologies based on the above discussed possible interconnections. Interconnections 1005 illustrate computing systems that do not have a routing module and therefore C-Bricks are connected directly to I-Bricks. As illustrated, these interconnects use a serial 422 connection over a standard cable. Topologies 1010 illustrate computing systems having an L3 system controller and no L2 system controller. Here the L3 system controller uses a USB connection directly to the C-Bricks.

In FIG. 11, interconnections 1115 illustrate computing systems having three or more C-Bricks which, therefore, require a routing module, in which case an L2 system host is required. The L2 system controller is a USB host and the routing modules are USB hubs. In FIG. 12, interconnection topology 1208 illustrates a computing system having multiple L2 system controllers connected via a 10-base T hub. Here, an L3 system controller is optionally connected to the 10-base T hub.

Common Communication Interface

Figure 13:
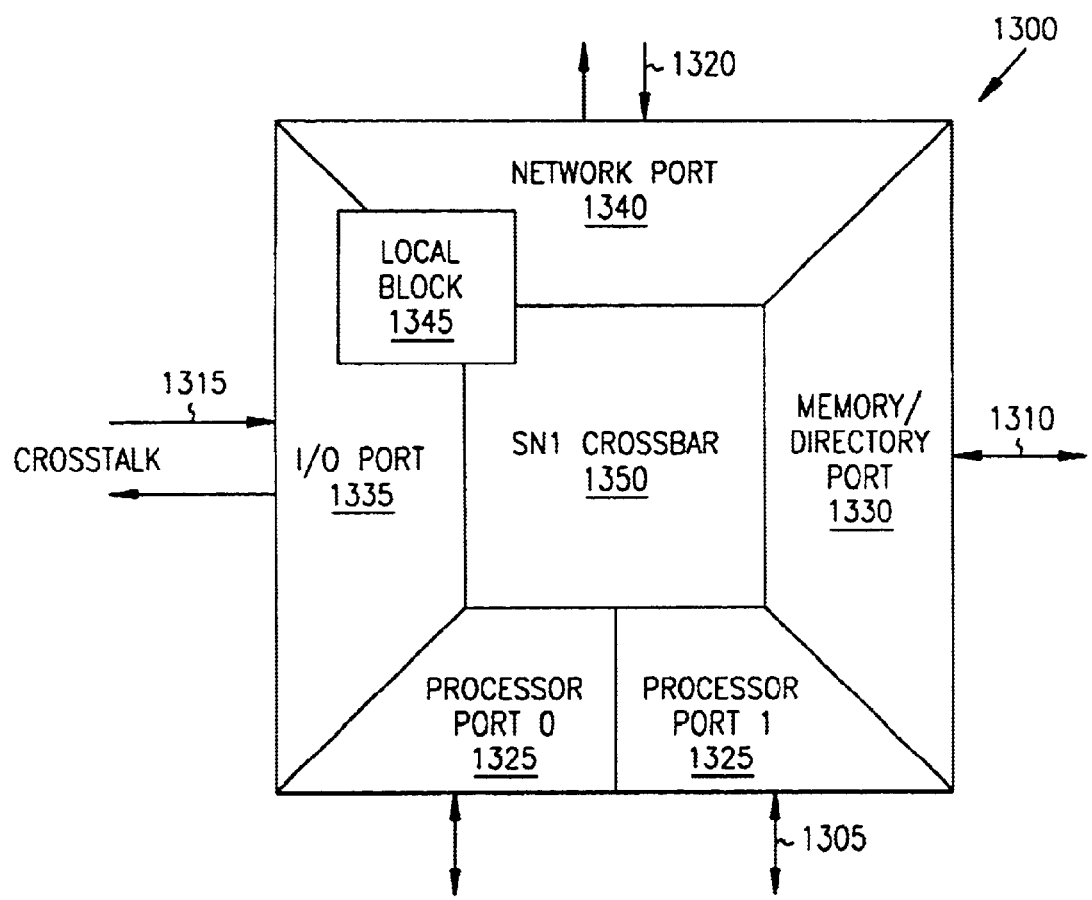
FIG. 13 illustrates one embodiment of a common communication interface present within each node of the architecture, thereby facilitating their flexible and scalable interconnection.

FIG. 13 illustrates one embodiment of an inventive high-speed common communication interface 1300 for interconnecting the various independent modules described herein. According to the invention, common communication interface 1300 provides connectivity between the various modules in a fair and efficient manner. Each node within the computing system includes a common communication interface 1300 that, as discussed in detail below, extends a "virtual" system bus throughout the distributed modules of the high-speed computing system. In this manner, processing nodes and other modules may be easily added and removed from the computing system.

Common communication interface 1300 includes four distinct interfaces. A A processor interface 1305 interfaces to one or more processing modules. Memory interface 1310 for interfacing to a portion of the global memory and for maintaining cache coherency across the computing system. I/O interface 1315 for communicating with an I/O subsystem. Common communication interface 1300 further includes a router interface 1320 for interfacing to a router module.

Internally, common communication interface 1300 includes five interface control units for managing its interfaces. More specifically, common communication interface 1300 includes a processor interface unit 1325, a memory interface unit 1330, an I/O interface unit 1335, a network interface unit 1340, and a local block 1345 for interfacing with the local chip resources. In this manner, common communication interface 1300 provides standard connectivity between four types of external interfaces and an interface to local chip resources.

The interface control units of node 1300 are connected by a central crossbar 1350 for exchanging data between the interfaces at high data rates. In this manner, common communication interface 1300 facilitates distributed modular computing systems that share a single address space. In one embodiment, common communication interface 1300 supports up to 256 processing nodes which, in one embodiment, comprise up to four processors each. Each interface control unit within common communication interface 1300 communicates by forwarding messages through, and receiving sending messages from, crossbar 1350. The messages used by the modules conform to a packetized network protocol. In one embodiment, two types of messages are supported: requests and replies. This configuration helps the computing system avoid system deadlock situations and promotes cache coherence. When a message arrives through I/O interface 1335 or network interface 1330, the message is converted to an internal format. The reverse occurs when a message is sent via one of these interfaces.

The internal message format for common communication interface 1300 consists of a header frame that is a group of bits that is conceptually and logically a single unit. This header frame is optionally followed by one or more data frames carrying a total of 64–1,024 bits of data for the message. As each frame is received by or transmitted from common communication interface 1300. Control signals embedded within the frame indicate all or some of the following information: 1) to which interface control unit the frame is destined, 2) whether the frame is a request or reply, and 3) whether the frame concludes the current message.

Figure 14:
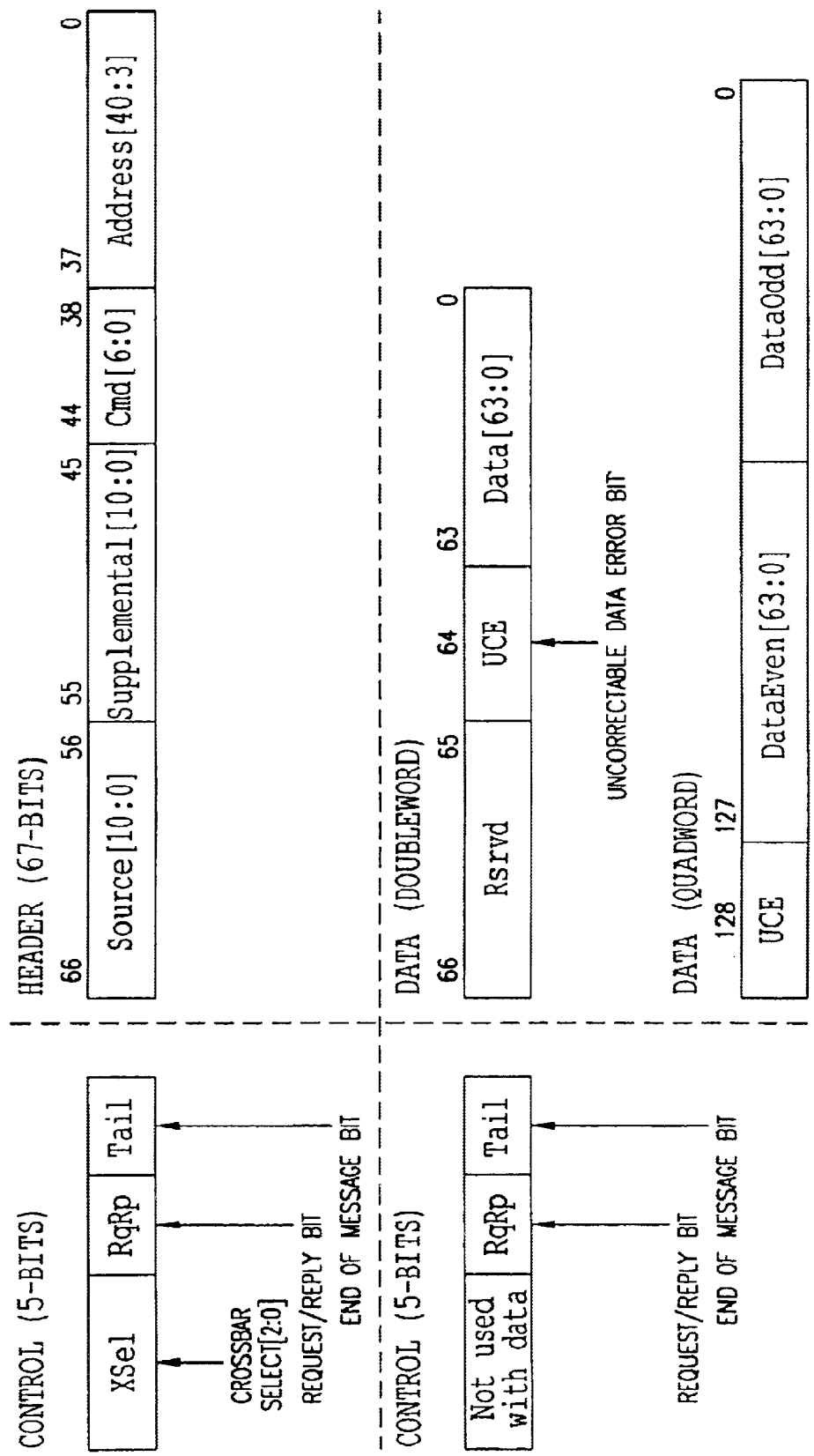
FIG. 14 illustrates one embodiment of an internal message format used by the common communication interface of FIG. 13.

FIG. 14 illustrates one embodiment of an internal message format for common communication interface 1300. More specifically, FIG. 14 illustrates control bits, header format and data formats. Within the header, a source is indicated via the most significant 11 bits. In one embodiment, the source identifies a device and a node.

Crossbar 1350 of common communication interface 1300 supports the flow of messages in the internal format discussed above along two virtual channels, multiplexed across physical channels connecting each unit of common communication interface 1300 to crossbar 1350. Crossbar 1350 is designed for minimal latency under light loads by means of a buffer queue bypass paths and maximum throughput under heavy loads by means of per virtual channel arbitration requests. It is in this manner that a plurality of nodes 135 may by used to interconnect the computing modules discussed herein in a variety of topologies.

Figure 15:
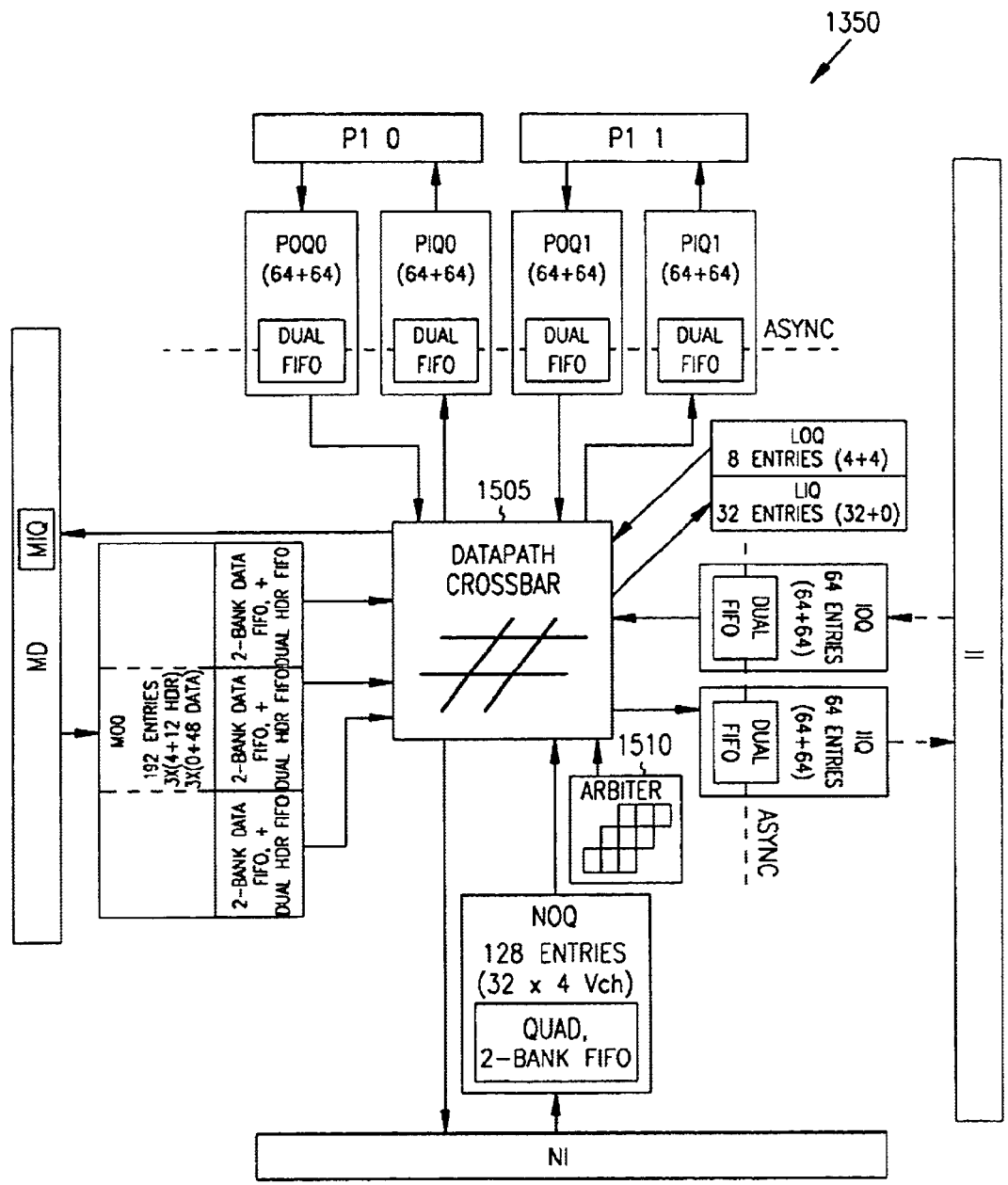
FIG. 15 is a block diagram illustrating one embodiment of an internal, high-speed crossbar of the common communication interface.

FIG. 15 is a block diagram of one embodiment of crossbar 1350 of common communication interface 1300. In the figure, a dual-FIFO refers to two virtual channel FIFOs within a single buffer memory structure. A quad-FIFO refers to four virtual channels in an analogous structure. Data path crossbar 1505 contains an 8-input by 6-output crossbar. The crossbar data path is 67 bits wide for all inputs and outputs and provides a 1.6 GB/s of data bandwidth per port at a 5 NS clock. The output queues provide buffering for outgoing unit messages and arbitrate for data path resources. The input queues provide buffering for data that has traversed the crossbar 1350 but has not yet been processed by its destination unit. Their primary role, therefore, is to provide rate matching and synchronization between crossbar 1350 and the receiving unit. Arbiter 1510 provides low-latency arbitration for uncontested ports via bypass arbitration and efficient high utilization via wave front arbitration as resources become saturated.

We claim:

1. A modular computing system comprising:
    a set of functionally independent processing nodes having one or more local processors and local memory, wherein each processing node includes a common communication interface for communicating with other nodes within the system via a messages conforming to a packetized network protocol, and wherein the common communication interface within each node connects the local memory to the local processors, provides at least one port for interfacing with the routing modules and at least one port for communicating with an input/output (I/O) subsystem;
    a system control hierarchy, wherein the system control hierarchy includes,
        a level one controller within each processing node,
        a level two controller providing rack-wide control, and
        a level three controller providing system-wide control; and 2. The system of claim 1, wherein the nodes operate in a global shared-memory address space.

3. The system of claim 1, wherein the common communication interface of each node may be directly coupled together, thereby eliminating the routing module.

4. The system of claim 1, wherein the level one controller within each node controls direct low-level communications within the node.

5. The system of claim 1, wherein the level three controller is a standalone workstation.

6. The system of claim 1, wherein the nodes are communicatively coupled to the routing modules via a high-speed Universal Serial Bus.

7. The system of claim 1, wherein each common communication interface includes:
  a processor interface for interfacing to one or more processing nodes;
  a memory interface for interfacing to local memory as a portion of the global memory and for maintaining cache coherency across the computing system;
  an I/O interface for communicating with an I/O subsystem.

8. The system of claim 1, wherein the common communication interface includes a plurality of interface control units.

9. The system of claim 8, wherein the common communication interface includes a central crossbar communicatively coupling each interface control unit for the exchange of data between the external interfaces at high data rates.

10. The system of claim 9, wherein the message protocol is a synchronous message protocol comprising requests and replies.

11. The system of claim 9, wherein the crossbar coverts the messages to an internal message format.

12. The system of claim 9, wherein crossbar communicates the messages across two internal two virtual channels by multiplexing the messages across physical channels connecting each unit.

13. The system of claim 9, wherein each interface control unit within common communication interface communicates by sending messages through the crossbar.

14. A processing node for a modular computing system comprising:
  one or more local processors;
  local memory;
  a common communication interface coupled to the local processors and the local memory, wherein the common communication interface includes:
    a processor interface for communicating with one or more external processing nodes;
    a memory interface by which the local processors and the external processor nodes communicating with the local memory;
    a routing interface for communicating with an external routing module; and
    an I/O interface for communicating with an I/O external subsystem; and a system control hierarchy, wherein the system control hierarchy includes,
    a level-one controller to provide communications between the one or more local processors and the local memory, wherein the level-one controller can act as a master controller to other components of the modular computing system, and wherein the common communication interface of the node may be directly coupled to a common communication interface of another such node via the I/O interface a level two controller providing rack-wide control, and a level three controller providing system-wide control.

15. The processing node of claim 14, wherein the nodes operate in a global shared-memory address space.

16. The processing node of claim 12 and further including a system controller for directing low-level communications within the node.

17. The processing node of claim 12, wherein the routing interface includes a high-speed Universal Serial Bus.

18. The processing node of claim 12, wherein the common communication interface includes a plurality of interface control units.

19. The processing node of claim 18, wherein the common communication interface includes a central crossbar communicatively coupling each interface control unit for the exchange of data between the external interfaces at high data rates.

20. The processing node of claim 18, wherein each interface control unit within common communication interface communicates by sending messages through the crossbar.

21. The processing node of claim 18, wherein the crossbar coverts the messages to an internal message format.

22. The system of claim 18, wherein crossbar communicates the messages across two internal two virtual channels by multiplexing the messages across physical channels connecting each unit.

23. The processing node of claim 12, wherein the message protocol is a synchronous message protocol comprising requests and replies.

24. A modular computing system comprising:
  a set of functionally independent processing nodes operating in a global, shared address space, wherein each node has one or more local processors and local memory, wherein each processing node includes a common communication interface for communicating with other modules within the system via a message protocol, and further wherein the common communication interface provides a single high-speed communications center within each node to operatively couple the node to one or more external processing nodes, an external routing module, or an input/output (I/O) module; and
  a system control hierarchy, wherein the system control hierarchy includes,
    a level one controller within each processing node,
    a level two controller providing rack-wide control, and
    a level three controller providing system-wide control.

25. The system of claim 24, wherein the computing system may include an arbitrary combination of processing nodes and other modules such that there need not be a fixed relation between the number of processing nodes and the other modules.

* * * * *

UNITED STATES PATENT AND TRADEMARK OFFICE
CERTIFICATE OF CORRECTION

PATENT NO. : 6,829,666 B1
DATED : December 7, 2004
INVENTOR(S) : Deneroff et al.

It is certified that error appears in the above-identified patent and that said Letters Patent is hereby corrected as shown below:

Title page,
Item [56], References Cited, OTHER PUBLICATIONS, "Laudon, J., et al." reference, delete "ccNUMA" and insert -- CCNUMA --, therefor; and delete "ARchitecture" and insert -- Architecture --, therefor.

Column 10,
Line 8, after "interface" insert -- ; --.
Lines 12, 15, 17 and 35, delete "claim 12" and insert -- claim 14 --, therefor.

Signed and Sealed this

Tenth Day of May, 2005

JON W. DUDAS
*Director of the United States Patent and Trademark Office*